United States Patent
Nagate et al.

[11] Patent Number: 5,371,426
[45] Date of Patent: Dec. 6, 1994

[54] ROTOR OF BRUSHLESS MOTOR

[75] Inventors: Takashi Nagate; Kenichi Endo; Yoshikazu Koike; Takeshi Seto; Yoshihiko Yamagishi, all of Suwa, Japan

[73] Assignee: Seiko Epson Corporation, Tokyo, Japan

[21] Appl. No.: 64,018

[22] PCT Filed: Jul. 10, 1991

[86] PCT No.: PCT/JP91/00927
§ 371 Date: May 19, 1993
§ 102(e) Date: May 19, 1993

[87] PCT Pub. No.: WO92/09131
PCT Pub. Date: May 29, 1992

[30] Foreign Application Priority Data

Nov. 20, 1990 [JP] Japan ................. 2-314626
Nov. 20, 1990 [JP] Japan ................. 2-314627

[51] Int. Cl.$^5$ .......................................... H02K 21/12
[52] U.S. Cl. ........................ 310/156; 310/261; 310/271
[58] Field of Search ............... 310/156, 261, 43, 271

[56] References Cited

U.S. PATENT DOCUMENTS

| 4,393,320 | 7/1983 | Anderson | 310/156 |
| 4,445,062 | 4/1984 | Glaser | 310/156 |
| 4,506,181 | 3/1985 | Jones | 310/156 |
| 4,674,178 | 6/1987 | Patel | 310/43 |
| 5,191,256 | 3/1993 | Reiter, Jr. et al. | 310/156 |

FOREIGN PATENT DOCUMENTS

| 0021525 | 6/1974 | Japan . |
| 0033482 | 7/1974 | Japan . |
| 0034170 | 2/1983 | Japan . |
| 0209942 | 8/1989 | Japan . |

Primary Examiner—R. Skudy
Attorney, Agent, or Firm—Kanesaka & Takeuchi

[57] ABSTRACT

A rotor (31) of a brushless motor includes a rotary shaft (32), a main yoke (33) fitted over the rotary shaft, two magnetic pole heads (34a, 34b) radially projecting from the main yoke, two permanent magnets (36a, 36b) provided on the yoke between the magnetic pole heads such that the magnetic poles of identical polarity face each other across the rotary shaft, two auxiliary yokes (38a, 38b) mounted on the permanent magnets, and a cylindrical sleeve (40) made of a non-magnetic material provided on the outer circumferential surface of the magnetic pole heads and the auxiliary yokes.

4 Claims, 8 Drawing Sheets

ROTOR OF BRUSHLESS MOTOR

SPECIFICATION

1. Technical Field

This invention relates to a brushless motor which is of high efficiency and can be easily manufactured, and particularly to a rotor of such a brushless motor.

2. Prior Art

The brushless motor generally comprises a cylindrical rotor and permanent magnets made of ferrite or the like arranged on the outer peripheral surface thereof.

Figure 6:
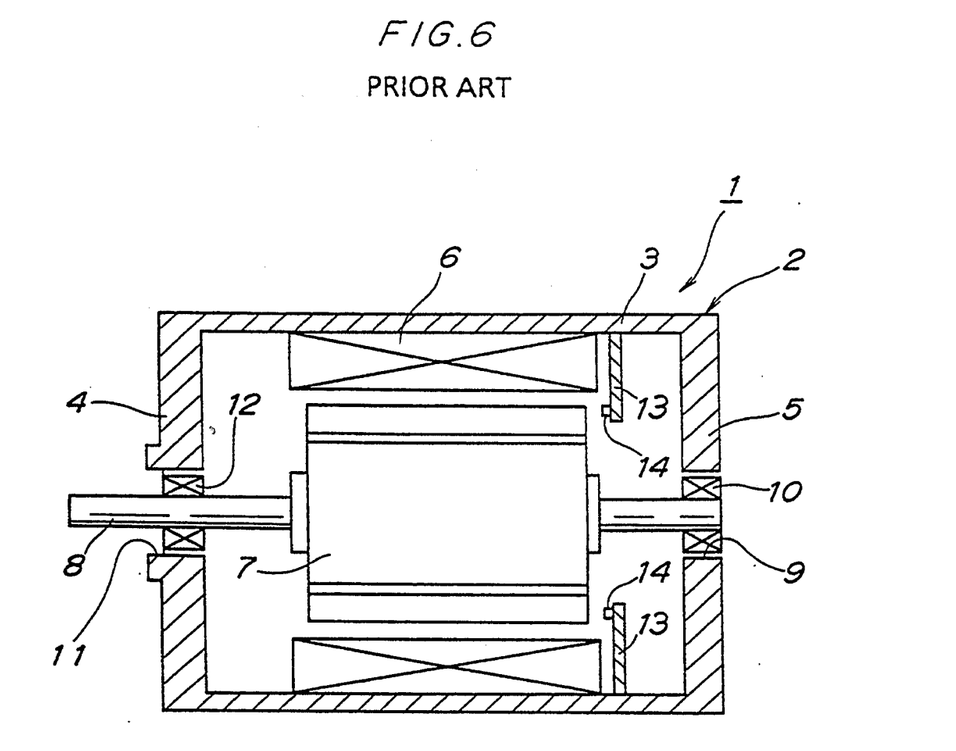
FIG. 6 is an axial sectional view showing a brushless motor of prior art.

As shown in FIG. 6 of the attached drawing, a typical brushless motor 1 of prior art has a motor casing (i.e., stator) 2 comprising a cylindrical side wall 3, and front end plate 4 and a rear plate 9 both serving to block up opposite ends of the side wall 3, respectively. Inside the side wall 3, there are provided a plurality of excitation coils 6 arranged to define a cylindrical array and fixed to the inner surface of the side wall 3. A rotor 7 is concentrically provided with a rotatable shaft 8 fixed thereto. The rotatable shaft 8 projects from opposite ends of the rotor 7 so as to be rotatably supported at one end in a bearing 10 carried by an opening a of the rear end plate 5 and at the other end in a bearing 12 carried by an opening 11 of the front plate 4 of the motor casing 2. There is provided inside the side wall 3 of the motor casing 2 an annular member 13 adapted to hold a plurality of magnetic pole sensors 14 so that these sensors 14 are properly positioned closely adjacent one end surface of the rotor 7.

The rotor including permanent magnets for brushless motor generally comprises a yoke provided with slots serving to receive field permanent magnets.

Figure 7:
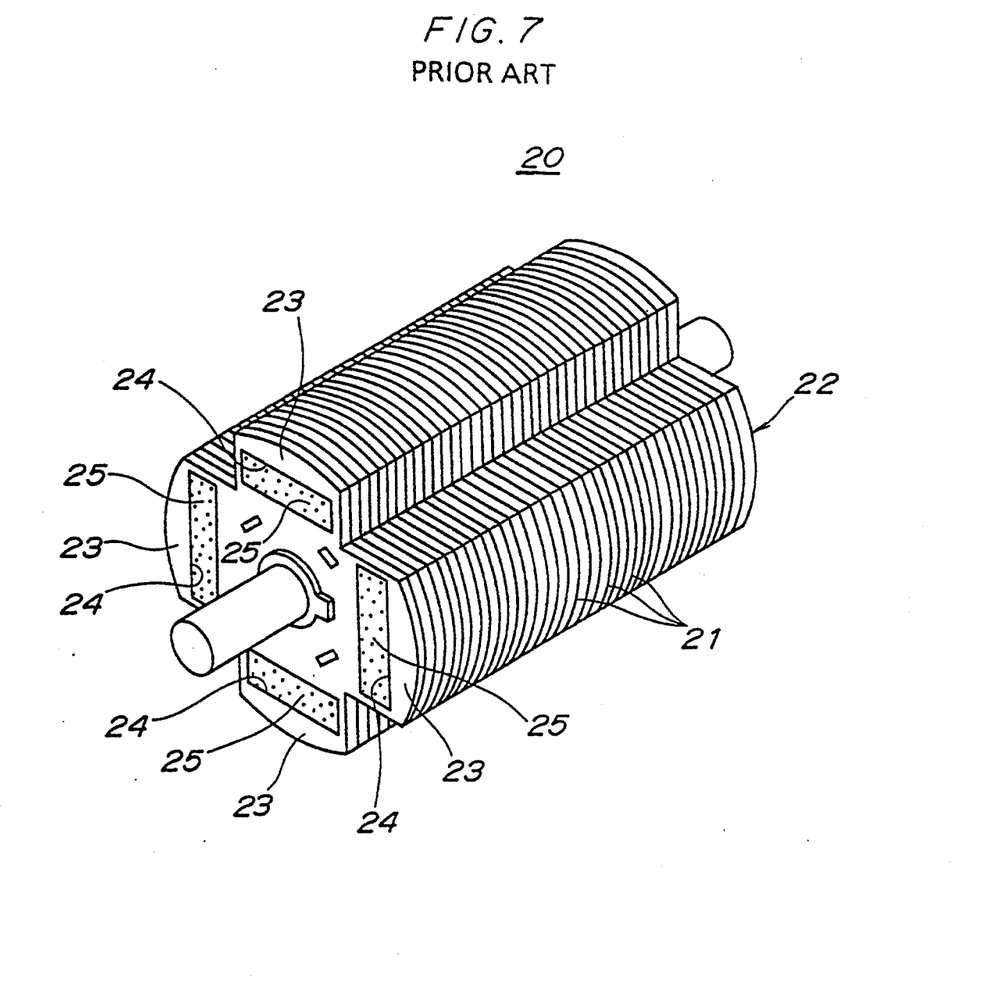
FIG. 7 is a perspective view showing a rotor of prior art.
Figure 8:
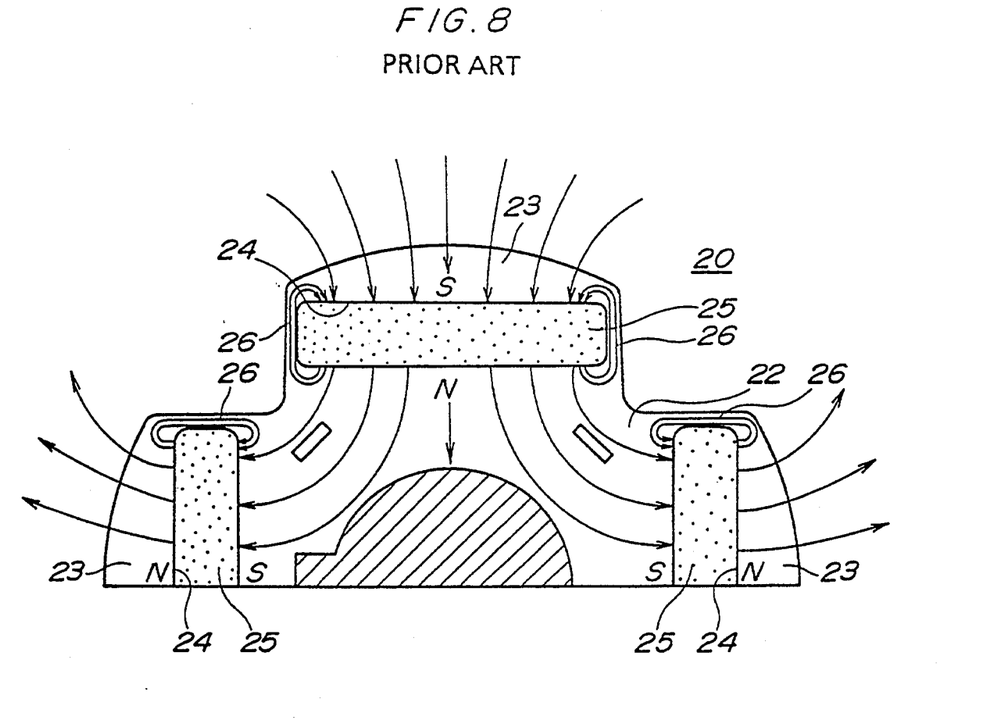
FIG. 8 is a fragmentary sectional view showing the rotor of prior art in an enlarged scale.

Referring to FIG. 7 of the attached drawing, a conventional rotor 20 provided with the permanent magnets is isometrically shown with a yoke 22 formed from a plurality of integrally laminated silicon steel sheets 21. The yoke 22 has four magnetic poles 23 projecting radially outward and slots 24 adjacent outer ends of the respective magnetic poles to receive the respective field permanent magnets 25. The respective magnetic poles 23 are magnetized by these field permanent magnets 25. FIG. 8 of the attached drawing is a fragmentary sectional view showing the permanent magnet rotor 20 in an enlarged scale. As shown, the field permanent magnets 29 are inserted into the respective slots 24 so that N- and S-poles alternately look outward. With consequence, the field permanent magnets 25 generate magnetic flux extending from the respective N-poles through the yoke 22 and the external space surrounding the permanent magnet rotor 20, respectively, to the respective S-poles. The magnetic flux passing through the external space surrounding the permanent magnet rotor 20 intersects the stator provided around the rotor and interacts with electric current flowing through excitation coils of the stator to drive the permanent magnet rotor.

The yoke of the conventional permanent magnet rotor is formed with bridges 26 adapted to connect the outer ends with the bases of the respective magnetic poles. More specifically, as seen in FIG. 8, portions of the yoke 22 define the bridges 26 connecting the outer ends with the bases of the respective magnetic poles 23. A part of the magnetic flux which exits from each field permanent magnet 25 passes through the bridges 26 and reaches the S-pole of the same field permanent magnet 25. This magnetic flux passing through the bridges 26 does not contribute to rotational drive of the rotor and an efficiency of the field permanent magnets is correspondingly deteriorated.

Furthermore, with the conventional permanent magnet rotor, each field permanent magnet 25 of elongate configuration must be inserted into the relatively narrow slot and therefore the field permanent magnet 25 has sometimes been liable to be damaged during this inserting operation.

Accordingly, it is an object of the invention to provide a permanent magnet rotor of a simplified structure which is able to utilize the entire magnetic flux generated from the field permanent magnets for rotational driving, thereby improving the motor efficiency, on one hand, and facilitating assembling operation in the course of manufacturing process, on the other hand.

DISCLOSURE OF THE INVENTION

The object set forth above is achieved, in accordance with a first aspect of the invention, by a rotor for brushless motor, the rotor comprising a rotatable shaft, a main yoke integrally mounted on the rotatable shaft, the main yoke having at least a pair of magnet pole heads projecting therefrom radially outward and provided between each pair of the adjacent magnetic pole heads with a magnet seat, field permanent magnets mounted on the respective magnet seats with their magnetic poles of the same polarity being opposed to the rotatable shaft, auxiliary yokes mounted on outer surfaces of the respective field permanent magnets, and a cylindrical sleeve made of nonmagnetic material tightly fitted on the outer periphery defined by outer ends of the magnetic pole heads and the auxiliary yokes.

With such arrangement, there is no magnetic substance between both poles of each field permanent magnet and, therefore, the entire magnetic flux exiting from the N-pole of each permanent magnet passes through the external space around the rotor and then returns to the S-pole of this permanent magnet. Accordingly, the entire magnetic flux intersects the stator and effectively contributes to the rotation of the rotor.

Additionally, since the field permanent magnets are held between the magnet seats of the main yoke and the auxiliary yokes, assembly of the rotor is facilitated.

Furthermore, mutual repulsion of the magnetic poles having the same polarities generates the magnetic poles, the number of which corresponds to twice the number of field permanent magnets and thereby simplifies the rotor's construction because of the unique arrangement of the field permanent magnets with their magnetic poles of the same polarity being opposed to the rotatable shaft.

The object is achieved also, in accordance with a second aspect of the invention, by a rotor of brushless motor, the rotor comprising a rotatable shaft, a main yoke integrally mounted on the rotatable shaft, the main yoke having at least a pair of magnetic pole heads projecting therefrom radially outward and provided between each pair of the adjacent magnetic pole heads with a magnetic seat, field permanent magnets mounted on the respective magnet seats with their magnetic poles of the same polarity being opposed to the rotatable shaft, auxiliary yokes mounted on outer surfaces of the respective field permanent magnets and connector member made of nonmagnetic material connecting the auxiliary yokes to the main yoke so that the respective field permanent magnets may be held between the main yoke and the respective auxiliary yokes.

With this permanent magnet rotor constructed in accordance with the second aspect of the invention, the resinous molded material or the die cast material is used to connect the auxiliary yokes each defining the outer end of the magnetic pole with the main yoke defining the bases of the respective magnetic poles so that the entire magnetic flux generated from the field permanent magnets pass through the external space around the rotor and then reaches the adjacent magnetic poles. Consequently, the entire magnetic flux generated from the field permanent magnets intersects the stator provided around the rotor and interacts with electric current flowing through the excitation coils, effectively contributing to the rotation of the rotor.

Further, the permanent magnet rotor according to the second aspect of the invention has the main yoke, field permanent magnets and auxiliary yokes mounted as piled, so that the field permanent magnets are not required to be inserted into a narrow slot, thereby capable of completely preventing the permanent magnets from being damaged during inserting.

PREFERRED EMBODIMENTS OF THE INVENTION

The invention will be readily understood from the following description made with reference to the attached drawings.

Initially, the first aspect of the invention will be discussed with reference to FIGS. 1 through 3.

Figure 1:
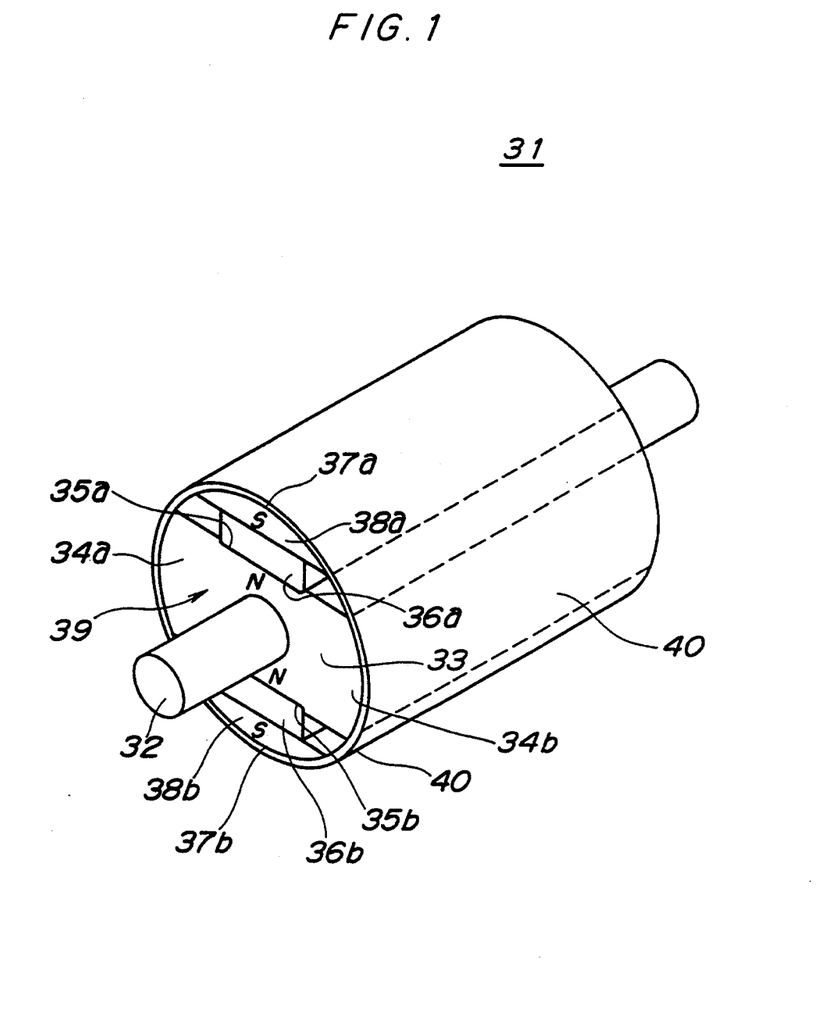
FIG. 1 is a perspective view showing an embodiment of the permanent magnet rotor constructed in accordance with the first aspect of the invention.

FIG. 1 shows an embodiment of the permanent magnet rotor constructed according to the invention. A permanent magnet rotor designated generally by reference numeral 31 has a main yoke 33 centrally provided with a rotatable shaft 32 forcibly inserted thereinto. This main yoke 33 has a pair of magnetic pole heads 34a, 34b spaced from each other by an angle of 180° and projecting radially outward. The main yoke 33 is provided on the outer peripheral sections defined between the magnetic pole heads 34a, 34b with magnet seats 35a, 35b. Field permanent magnets 36a, 36b are mounted on the magnet seats 35a, 35b, respectively, with their N-poles being opposed to each other. S-poles of the field permanent magnets 36a, 36b carry thereon auxiliary yokes 38a, 38b, respectively, which define outer ends of magnetic poles 37a, 37b of the permanent magnet rotor 31. An assembly 39 comprising the main yoke 33, the field permanent magnets 36a, 36b and the auxiliary yokes 38a, 38b have an outer periphery presenting substantially circular cross-section and a cylindrical sleeve 40 made of nonmagnetic material is tightly fitted around the outer periphery.

Figure 2:
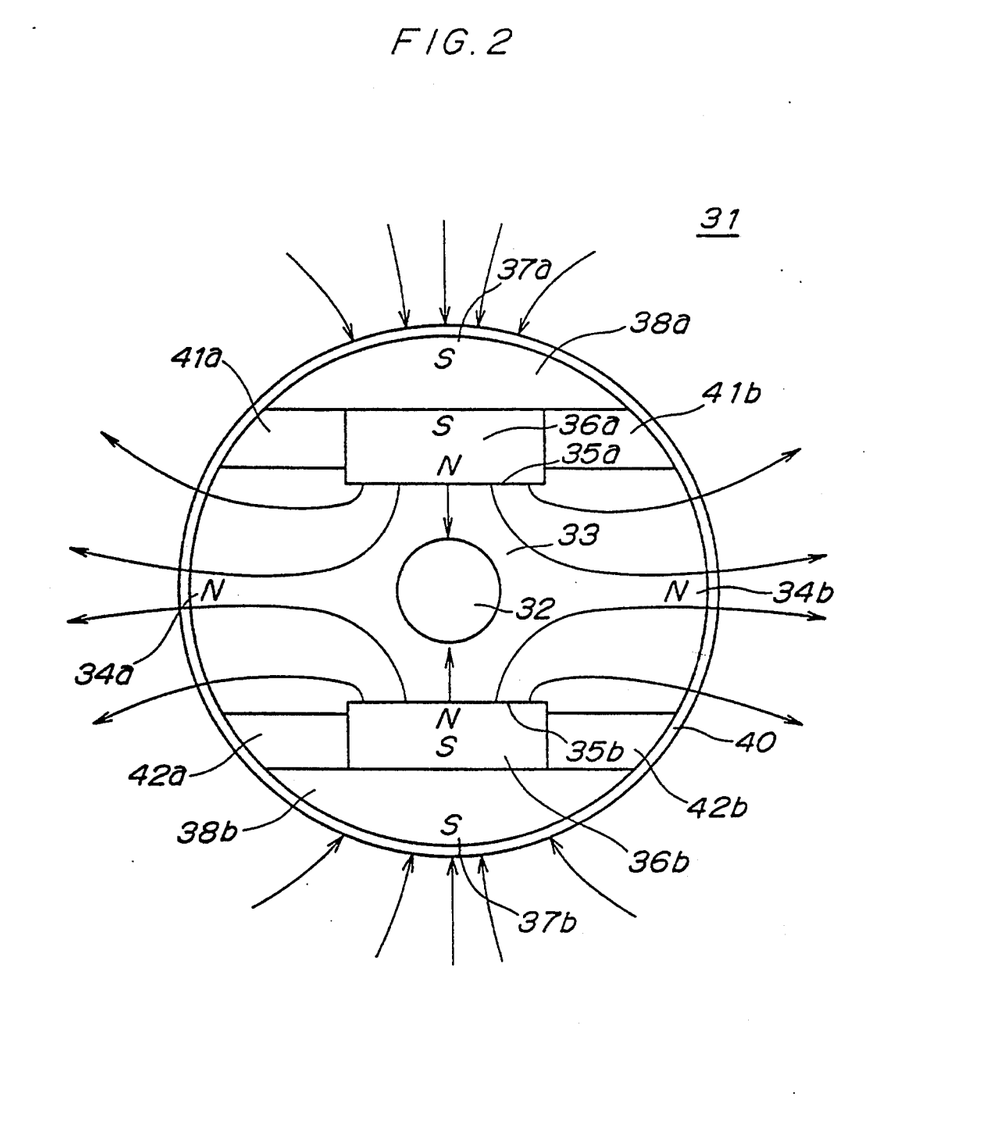
FIG. 2 is a side view of this rotor.
Figure 3:
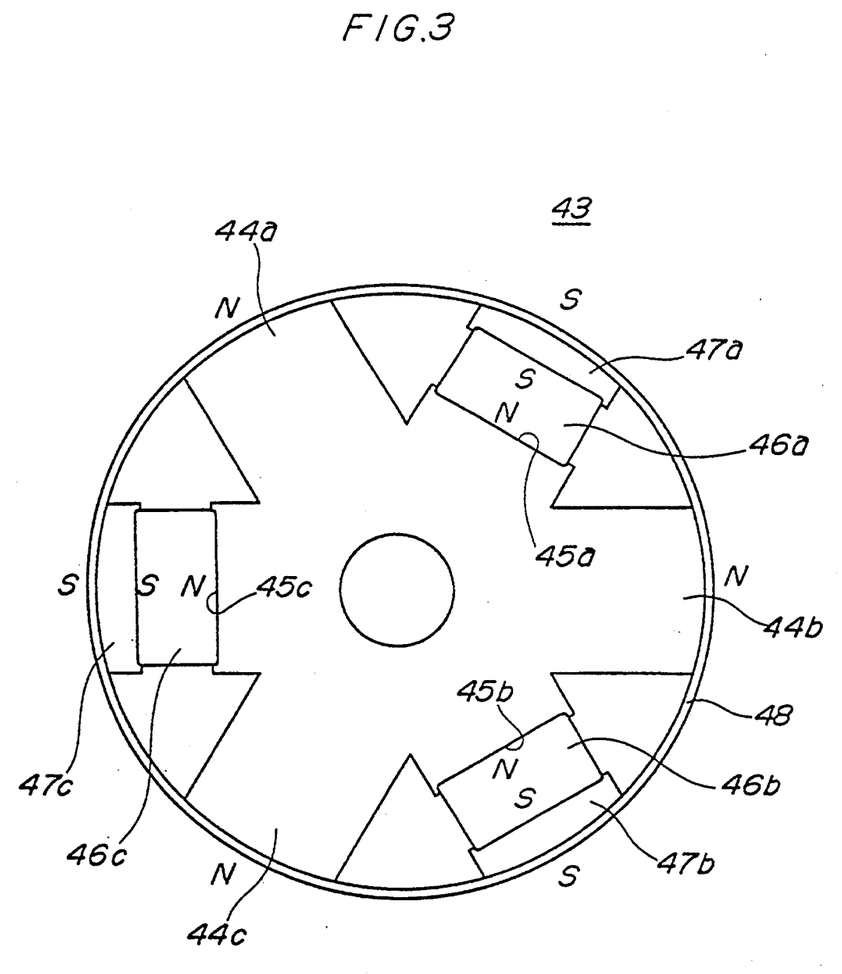
FIG. 3 is a side view showing a variant of rotor.

FIG. 2 is a side view of the permanent magnet rotor 31 with the field permanent magnets 36a, 36b being mounted on the respective magnet seats 35a, 35b of the main yoke 33 so that their N-poles are opposed to each other. Mutual repulsion of the N-poles causes magnetic flux generated from the field permanent magnets 36a, 36b to extend, as shown, from the respective magnetic pole heads 34a, 34b through the external space around the permanent magnet rotor 31 to the magnetic poles 37a, 37b. As a result, the magnetic pole heads 34a, 34b are magnetized in N-polarity while the magnetic poles 37a, 37b are magnetized in S-polarity.

In this permanent magnet rotor 31, there are provided spaces 41a, 41b and 42a, 42b of low magnetic permeability which are contiguous to the N-poles and the S-poles of the field permanent magnets 36a, 36b, respectively. Consequently, the magnetic flux is rather guided through the main yoke 33 of high magnetic permeability instead of going across these space 41a, 41b, 42a, 42b and emitted to the exterior via the magnetic pole heads 34a, 34b. In this manner, the entire magnetic flux generated from the field permanent magnets 36a, 36b passes through the external space around the permanent magnet rotor 31 and intersects the stator (not shown), thus effectively contributing to the rotation of the rotor 31.

The first aspect of the invention is obviously applicable also to the permanent magnet rotor having any number of magnetic poles. FIG. 3 is a side view showing a variant of the above-mentioned embodiment. A main yoke of this permanent magnet rotor 43 has three magnetic pole heads 44a, 44b, 44c spaced from one another by an angle of 120° and projecting radially outward. Between respective pairs of the adjacent magnetic pole heads, there are provided magnet seats 45a, 45b, 45c carrying three field permanent magnets 46a, 46b, 46c, respectively, with their N-poles being opposed to a rotatable shaft. These field permanent magnets carry, in turn, auxiliary yokes 47a, 47b, 47c on their outer sides, respectively. A cylindrical sleeve 48 is tightly fitted around an assembly comprising the main and auxiliary yokes.

The permanent magnet rotor 43 is similar to the previously mentioned embodiment in that the N-poles of the respective field permanent magnets repulse one another to generate magnetic poles. But, in this case, there are generated six magnetic poles which are magnetized alternately in N- and S-polarities, as shown. This variant is similar to previous embodiment also in that the entire magnetic flux generated from the N-poles of the respective field permanent magnets passes through the exterior of the rotor and then reaches the S-poles of the adjacent field permanent magnets, resulting in that the magnetic flux effectively contributes to the rotation of the rotor.

According to the first aspect of the invention as has been described hereinabove, the field permanent magnets are arranged with their magnetic poles of the same polarity being opposed to one another so that the mutual repulsion of these magnetic poles may generate magnetic poles, the number of which corresponds to twice the number of the field permanent magnets and thereby simplifying the construction of the permanent magnet rotor.

The feature that there is provided the space of low magnetic permeability which is contiguous to the N- and S-poles of the respective field permanent magnets advantageously results in that the entire magnetic flux of the field permanent magnets passes through the external space around the rotor and intersects the stator, thus effectively contributing to the rotation of the rotor.

The additional feature that the field permanent magnets are mounted on the outer periphery of the main yoke and the auxiliary yokes are mounted on the outer sides of the respective field permanent magnets conveniently eliminates the demand for operation of inserting the field permanent magnets into the slots or the like and thereby facilitates the assembling operation.

As will be appreciated from the foregoing description, the first aspect of the invention provides the permanent magnet rotor which requires the minimum number of permanent magnets, has a correspondingly simplified structure, utilizes the entire magnetic flux generated from the field permanent magnets to drive the rotor and can be easily assembled in the course of manufacturing.

Then, the second aspect of the invention will be described with reference to FIGS. 4 and 5.

Figure 4:
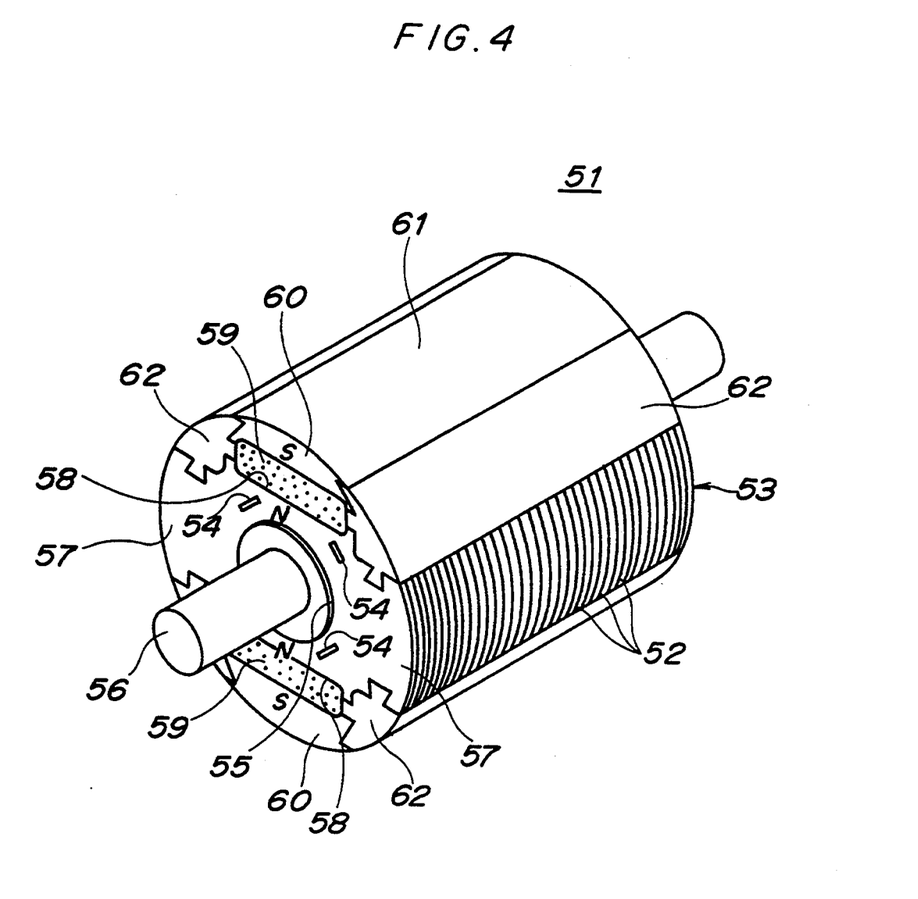
FIG. 4 is a perspective view showing an embodiment of the permanent magnet rotor constructed in accordance with the second aspect of the invention.

FIG. 4 shows a permanent magnet rotor constructed in accordance with the second aspect of the invention. A permanent magnet rotor 91 centrally has a main yoke 53 comprising a plurality of integrally laminated silicon steel sheets 52. Each of these silicon steel sheets 92 has a plurality of rectangular recesses 54 formed by pressing process so that these silicon steel sheets may be put together by forcing the recesses 54 into engagement with one another and thereby integrated into the main yoke 53. The main yoke 53 is centrally formed with an opening 55 axially extending therethrough to receive a rotatable shaft 56 which has, in turn, a key by means of which the rotatable shaft 56 is rotated integrally with the main yoke 53. The main yoke 53 has along its outer periphery a pair of magnetic poles 57 projecting radially outward and a pair of magnet seats 58. The magnet seats 58 are formed symmetrically with respect to the rotatable shaft 56 and carry thereon a pair of field permanent magnets 59, respectively, with their magnetic poles of the same polarity being opposed to each other. In this specific embodiment, the field permanent magnets 99 are shaped in flat boards and mounted on the magnet seats with their N-poles being opposed to each other.

There are provided on the S-pole sides of these field permanent magnets 59 auxiliary yokes 61 each functioning as a magnetic pole 60. A space defined between each pair of the adjacent magnetic poles 57, 60 is filled with resinous molded member or die cast member to form a molded portion 62 which integrally assembles the main yoke 53, the field permanent magnet 59 and the auxiliary yoke 61. Outer peripheries of the respective molded portions 62 are formed in continuity with the magnetic pole surface of the magnetic poles 57, 60 so as to form together a cylindrical outer periphery of the permanent magnet rotor 51.

Figure 5:
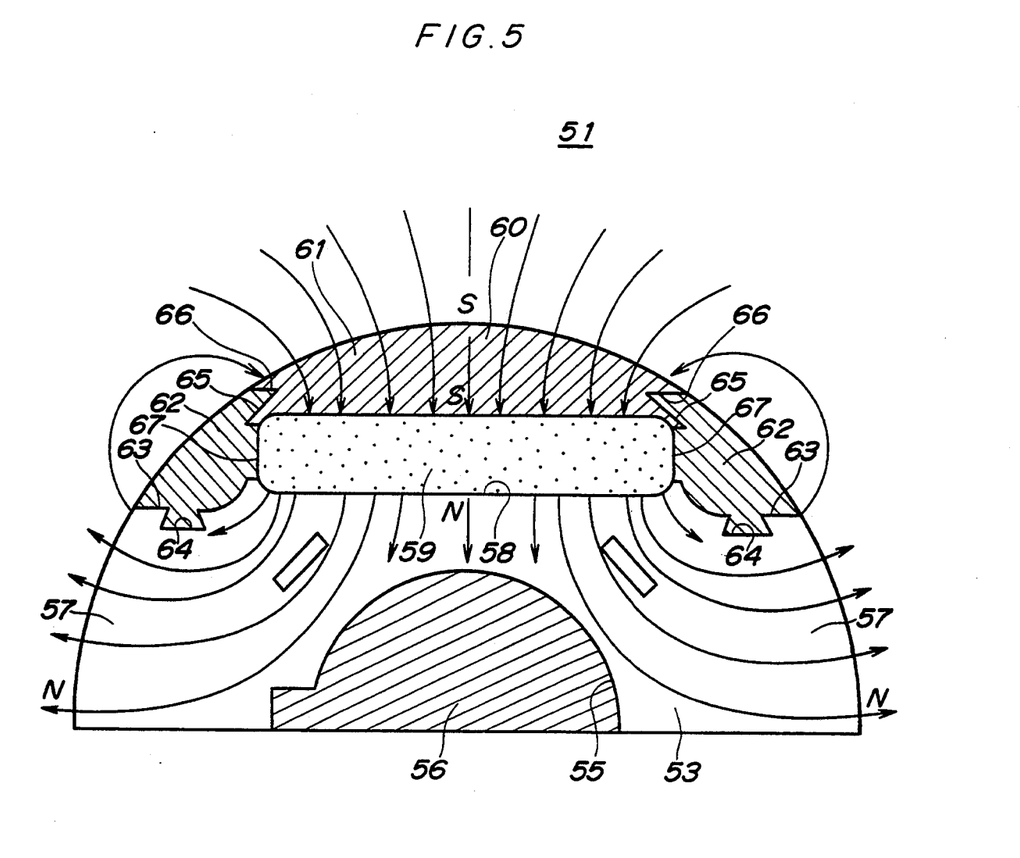
FIG. 5 is a fragmentary sectional view showing this rotor in an enlarged scale.

FIG. 5 is a fragmentary sectional view showing the permanent magnet rotor 51 in an enlarged scale. The main yoke 53 has joint surfaces 63 destined to be in contact with the respective molded portions 62 between the magnetic poles 57 and the magnet seats 58, respectively. Each joint surface 63 is formed with a dovetail 64 adapted to be engaged with the associated molded portion 62. On the other hand, each auxiliary yoke 61 has, between its magnetic pole surface and its surface contacting the associated field permanent magnet 59, a joint surface 65 destined to be in contact with the associated molded portion 62. Each joint surface 65 is formed with a dovetail 66 adapted to be engaged with the associated molded portion 62.

In the course of manufacturing the permanent magnet rotor 51, liquefied material to be molded is poured into a space defined between the main yoke 53 and the auxiliary yokes 61 and simultaneously into the grooves of the respective dovetails 64, 66. Once the liquefied material has been solidified and the molded portions 62 have been obtained, the main yoke 53 and the auxiliary yokes 61 are engaged with the molded portions 62 along the respective dovetails 64, 66 so as to hold the field permanent magnets 59 therebetween. Such a construction is effective to prevent the field permanent magnets 59 as well as the auxiliary yokes 61 from centrifugally flying off during its operation.

As described above, the field permanent magnets 59 are arranged with their N-poles being opposed to each other and, in consequence, the magnetic flux generated from these field permanent magnets 59 describes, under the mutual repulsing effect of the opposing magnetic poles, lines extending from the magnetic poles of the main yoke 53 through the external space around the permanent magnet rotor 51 to the magnetic poles 60 of the auxiliary yokes 61. The opposite end surfaces of each field permanent magnet 59 extending between the both poles thereof are contiguous to the molded portions 62 of low magnetic permeability and, consequently, no magnetic flux is short-circuited through the molded portions 62 to the S-poles. Namely, the entire magnetic flux generated from the field permanent magnets 59 intersects the stator (not shown) provided around the permanent magnet rotor 51 and effectively contributes to rotation of the rotor 51.

While the second aspect of the invention has been described in connection with the specific embodiment so constructed that the field permanent magnets are arranged with their magnetic poles of the same polarity being opposed to each other and mutual repulsion of these magnetic poles generates the magnetic poles along the outer periphery of the permanent magnet rotor, the number of which corresponds to twice the number of the permanent magnets, the invention is not limited to such a permanent magnet rotor but applicable also to the conventional permanent magnet having the same number of field permanent magnets as the number of magnetic poles. While this embodiment of permanent magnet rotor has four magnetic poles, the invention is obviously applicable also to the permanent magnet rotor having any number of magnetic poles.

According to the second aspect of the invention as has been described above, no part of the magnetic flux exiting one magnetic pole is short-circuited through the bridges to the other magnetic pole of each permanent magnet, since the bridges conventionally utilized to connect the main yoke with the auxiliary yokes are eliminated. In other words, the entire magnetic flux generated from the field permanent magnets passes through the external space around the permanent magnet rotor, then intersects the excitation coils of the stator and reaches the adjacent permanent magnet. The entire magnetic flux interacts with said excitation coils and thereby effectively contributes to the rotation of the rotor, thus providing the motor of high efficiency.

In addition, it is unnecessary for the permanent magnet rotor of the invention to insert the permanent magnets of elongate configuration into the narrow slots and, as a result, damage of the permanent magnets possibly encountered by the prior art during the insertion of the permanent magnets can be perfectly avoided. Correspondingly, manufacturing of the permanent magnet rotor can be facilitated.

INDUSTRIAL USEFULNESS

As will be appreciated from the foregoing description, a simple and efficient brushless motor which is suitable for high speed rotation can be realized by adopting the permanent magnet rotor of the invention.

We claim:

1. A rotor of a brushless motor comprising
a rotatable shaft,
a main yoke integrally mounted on said rotatable shaft, said main yoke having at least two magnetic pole heads projecting therefrom radially outwardly,
at least two field permanent magnets provided on the main yoke between the magnetic pole heads with their magnetic poles of a same polarity being opposed to the rotatable shaft,
at least two auxiliary yokes mounted on outer surfaces of the field permanent magnets, and
a cylindrical sleeve made of nonmagnetic material tightly fitted on an outer periphery defined by said magnetic pole heads and said auxiliary yokes.

2. A rotor of a brushless motor comprising
a rotatable shaft,
a main yoke integrally mounted on said rotatable shaft, said main yoke having at least two magnetic pole heads projecting therefrom radially outwardly,
at least two field permanent magnets provided on said main yoke between the magnetic pole heads with their magnetic poles of a same polarity being opposed to the rotatable shaft,
at least two auxiliary yokes mounted on outer surfaces of the field permanent magnets, and
at least two pairs of connector members made of nonmagnetic material so as to have dovetails for connecting said auxiliary yokes with the main yoke so that the field permanent magnets are held between the main yoke and the auxiliary yokes.

3. The rotor of a brushless motor according to claim 1, wherein at least two magnet seats for mounting said field permanent magnets are provided on said main yoke between the magnetic pole heads.

4. The rotor of a brushless motor of claim 2, wherein said main yoke is provided with at least two magnet seats between said magnetic pole heads for supporting said permanent magnets thereon.

* * * * *